Dec. 31, 1968 J. S. WIENER 3,419,278

CONTINUOUSLY RECYCLING MESSAGE TRANSMITTING SYSTEM

Filed Oct. 24, 1965 Sheet 1 of 3

INVENTOR.
Jack S. Wiener
BY Pendleton, Neuman
Seibold & Williams
Attorneys

CONTINUOUSLY RECYCLING MESSAGE TRANSMITTING SYSTEM

Filed Oct. 24, 1965

INVENTOR.
Jack S. Wiener
BY Pendleton, Neuman Seibold & Williams
Attorneys

INVENTOR.
Jack S. Wiener
BY Pendleton, Neuman,
Seibold & Williams
Attorneys

United States Patent Office 3,419,278
Patented Dec. 31, 1968

3,419,278

CONTINUOUSLY RECYCLING MESSAGE TRANSMITTING SYSTEM

Jack S. Wiener, 1725 N. Wells St., Chicago, Ill. 60614

Filed Oct. 24, 1965, Ser. No. 504,698
13 Claims. (Cl. 274—13)

ABSTRACT OF THE DISCLOSURE

A self-contained continuously recycling phonograph system including a phonograph arm having a playback stylus and a recycling stylus attached thereto, and a phonograph record with spiral recorded and spiral recycling grooves that are spirally wound in opposite directions. Cam members are disposed at opposite ends of the recycling groove and are adapted to be engaged by the recycling stylus for moving the playback stylus out of the recorded groove at the end thereof and into the recorded groove at the beginning thereof.

The present invention relates generally to continuously recycling message transmitting systems and, more specifically, to a continuously recycling phonograph system and a record therefor.

In various communication applications, it is desirable for a message to be continuously repeated. For example, it is often desirable to continuously repeat messages at product display centers or the like. Additionally, telephone weather reporting systems or the like are set up to continuously repeat messages. In the present conventional systems of this type, magnetic tape recorders are generally utilized. However, such systems have proved to be quite expensive. Consequently, it has been desirable to provide a new and improved system of the continuously recycling type which performs as well as present systems of this type and, yet, is less expensive.

A primary object of the present invention is to provide a new and improved continuously recycling message transmitting system. In this connection, it is an object to provide a continuously recycling phonograph system. A further object is to provide a new and improved phonograph record for use in such a system.

More specifically, it is an object to provide such a phonograph system of this type which raises the phonograph arm or tone arm when the playback stylus reaches substantially the end of the recorded groove on a phonograph record so that the stylus is moved out of the recorded groove and which moves the phonograph arm to a position adjacent the beginning of the recorded groove and lowers the tone arm so that the stylus is moved into the recorded groove at substantially the beginning thereof.

Still another object of the present invention is to provide a continuously recycling phonograph system which is self-contained.

An additional object is to provide such a system which is capable of repeating itself for an unlimited period of time.

A still further object is to provide a system wherein the critical components may be readily replaced.

Still another object is to provide such a system which will eventually recenter itself, regardless of the position in which the system begins, so that the system thereafter operates in a normal continuous fashion.

A general object of the present invention is to provide a new and improved continuously recycling phonograph system characterized in its simplicity, economy, ease of operation and ease of repair. Another general object is to provide a new and improved phonograph record for such a system characterized in its simplicity and economy.

Other objects and advantages of the invention will become apparent upon reading the attached detailed description, taken in conjunction with the drawings.

In one form of the present invention, a new and improved continuously recycling phonograph system is provided which includes a phonograph arm having a playback stylus and a phonograph record having a recorded groove formed therein, the record being engaged by the stylus during a playback operation. Means, such as a turntable, are provided for supporting the phonograph record for rotational movement. Finally, means are provided which respond to the stylus reaching substantially the end of the recorded groove for imparting movement to the arm to sequentially move the stylus (1) out of the recorded groove, (2) to a position adjacent the beginning of the recorded groove, and (3) into the recorded groove at substantially the beginning thereof. The invention also resides in the provision of a new and improved phonograph record for the system.

For the purpose of providing a detailed description of the phonograph system constructed in accordance with the teachings of the present invention, reference will now be made to the drawings wherein.

While the invention has been shown and will be described in some detail with reference to particular exemplary embodiments thereof, there is no intention that it be limited to such detail. Quite to the contrary, it is intended here to embrace all modifications, alternatives and equivalents falling within the spirit and scope of the invention as defined by the appended claims.

Figures 1, 2:
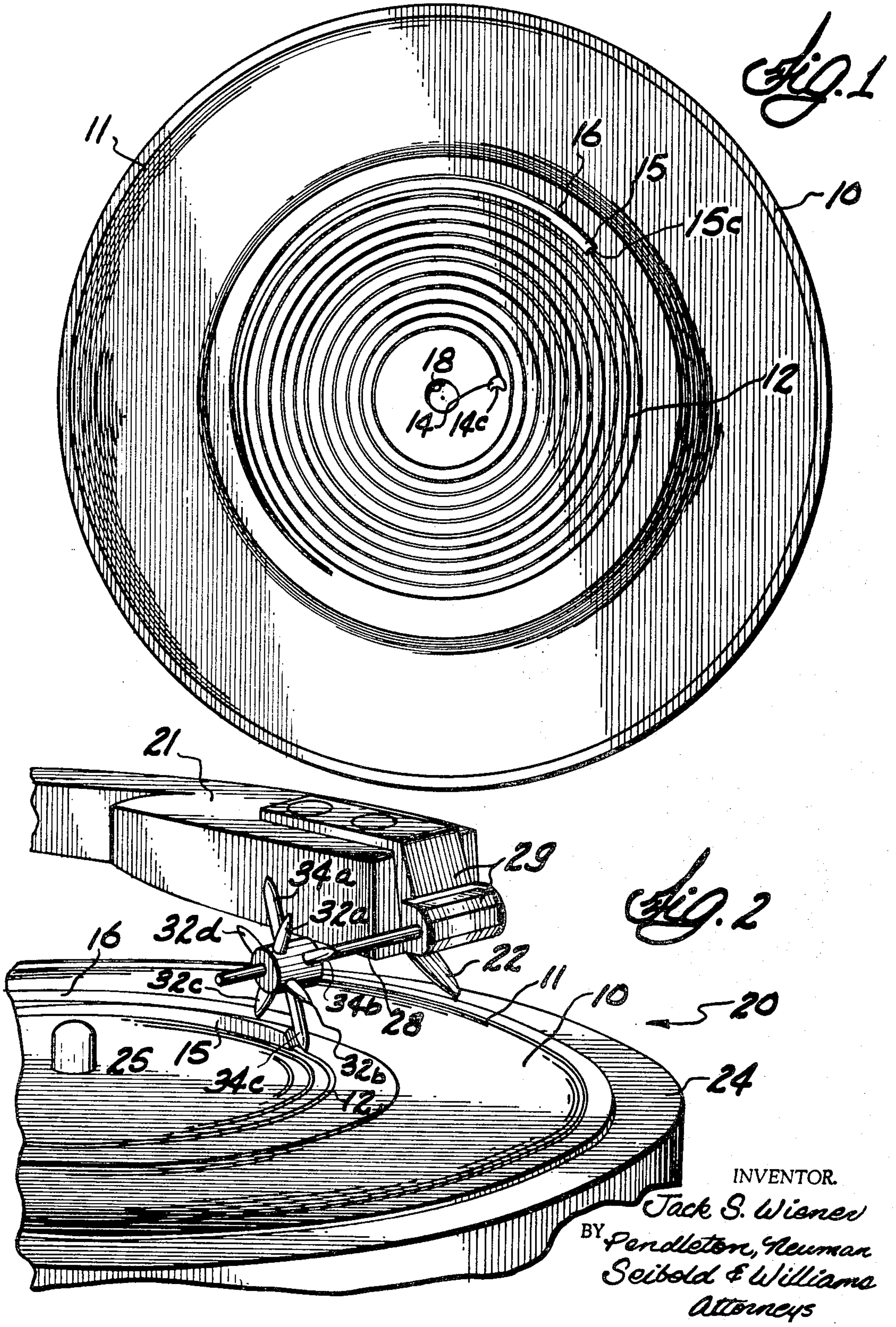
FIG. 1 is a top elevational view of a phonograph record constructed in accordance with the teachings of the present invention.
FIGS. 2–5 are partial perspective views of the phonograph system constructed in accordance with the teachings of the present invention, showing the system in various positions of operation.

Referring now to the drawings and more specifically to FIG. 1, a phonograph record 10 is shown which is constructed in accordance with the teachings of the present invention. As may be seen, the phonograph record 10 is in the form of a disc-type record. However, it will be apparent that this is merely illustrative of one form of a phonograph record falling within the spirit and scope of the present invention and that the present invention is intended to cover the use of various other phonograph records, such as cylindrical phonograph records. The exemplary record 10 has a conventional spiral recorded groove formed therein which is spirally wound inwardly toward the center of the record in the counterclockwise direction and which is to be engaged by a playback stylus during a playback operation. Additionally, the phonograph record 10 has a spiral recycling groove formed therein which is spirally wound inwardly toward the center of the record in a clockwise direction and which is to be engaged by a portion of a recycling stylus assembly, as will be discussed hereinafter. Thus, the recorded and recycling grooves are spirally wound in opposite directions. Finally, upstanding cam members 14 and 15 are disposed at opposite ends of the recycling groove 12 and an eccentric cam member 16 is associated with the cam member 15 for cooperating with the recycling stylus assembly, as will likewise be discussed hereinafter, to move the portion of the recycling stylus assembly into and out of the recycling groove. The cam member 15 is tapered downwardly, toward the surface of the record, from the beginning to the end thereof, i.e., is tapered downwardly in the counterclockwise direction as viewed in FIG. 1, and the cam member 16 curves inwardly, toward the center of the record, from the beginning to the end of the cam member 15.

Referring now to FIGS. 2–5, a continuously recycling phonograph system 20 constructed in accordance with the teachings of the present invention is shown. The exemplary phonograph system 20 includes a tone arm or phonograph arm 21 having a playback stylus 22 and a turntable or the like 24 which supports the previously described phonograph record 10 for clockwise rotational movement. For this latter purpose, the phonograph record 10 is provided with a conventional central bore 18 which receives an upstanding pin 25 forming a part of the turntable 24.

Figure 6:
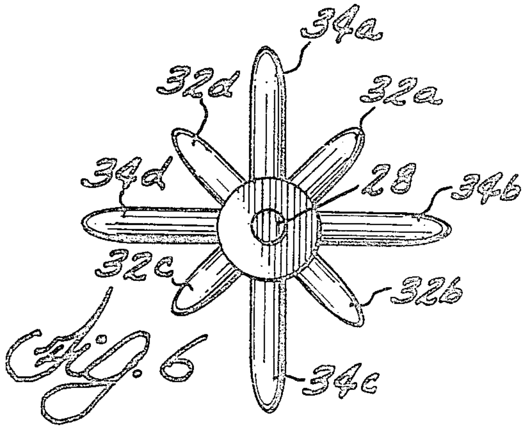
FIG. 6 is an end elevational view of a star wheel assembly employed in the exemplary phonograph system.
Figure 7:
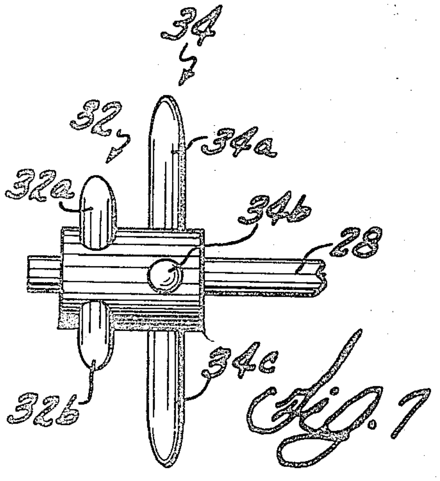
FIG. 7 is a side elevational view of the star wheel assembly shown in FIG. 6.

In accordance with the present invention, the phonograph system 20 includes means for responding to the stylus 22 reaching substantially the end of the recorded groove 11 for imparting movement to the arm 21 to sequentially move the stylus (1) out of the recorded groove, (2) to a position adjacent the beginning of the recorded groove and (3) into the recorded groove at substantially the beginning thereof. In the exemplary arrangement, a recycling stylus assembly is mounted on the phonograph arm 21 for cooperating with the cam members 14, 15 and 16 and the recycling groove 12 to impart such movement to the phonograph arm 21. It will be apparent that the recycling stylus assembly may be removably mounted for replacement. The recycling stylus assembly includes a pair of spaced star wheels 32 and 34, best seen in FIGS. 6 and 7, mounted for concurrent rotational movement on a shaft 28 which is journaled within an eight-step detent assembly 29 on the end of the phonograph arm. The detent assembly functions to maintain the star wheels in a given position until external rotational force is applied to the star wheels to cause the star wheels and the detent assembly to step to the next position. As may be seen, each of the star wheels has a plurality of outwardly extending legs. More specifically, the star wheel 32 has four outwardly extending legs *32a–32d* defining a four-point cross member and the star wheel 34 has four outwardly extending legs *34a–34d* which are angularly offset by 45° with respect to the legs *32a–32d* and which likewise define a four-point cross member. Additionally, it will be seen that the legs *34a–34d* are longer than the legs *32a–32d*. With the exemplary arrangement, the detent assembly 29 is designed to allow for concurrent stepping movement of the star wheels 32 and 34 in 45° segments so that, at any given instance, one of the legs *32a–32d* or *34a–34d* is projecting downwardly in perpendicular relationship with the record 10.

For the purpose of providing an understanding of the operation of the phonograph system 20, a description thereof will be set forth in conjunction with FIGS. 2–5. Initially, it will be assumed that the phonograph system 20 is approaching the condition shown in FIG. 2. Consequently, the leg *34c* of the star wheel 34 is vertically disposed within the recycling groove 12 in substantially perpendicular relationship with the record 10 and the playback stylus 22 is positioned substantially adjacent the beginning of the recorded groove 11. The star wheel 34 is so designed that when one of the legs *34a–34d* thereof is vertically disposed within the recycling groove 12, the phonograph arm 21 is maintained in a raised condition with respect to the record 10 so that the playback stylus 22 is maintained out of engagement with the recorded groove 11.

Figure 3:
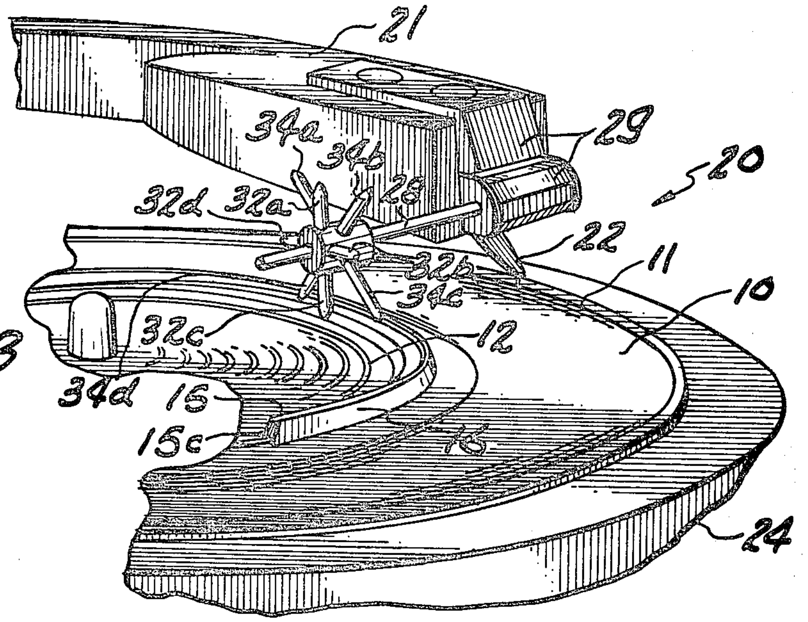

When the leg *34c* of the star wheel 34 has ridden in the recycling groove 12 to substantially the end thereof, as shown in FIG. 2, the leg *34c* is engaged by the leading edge of the cam member 15 which has a circular indentation *15c* for catching the leg *34c* to insure engagement therebetween. As further clockwise rotational movement is imparted to the record 10 by the turntable 24, pivotal movement is imparted to the star wheels 32 and 34 to allow the leg *34c* to move past the leading edge of the cam member 15 and into engagement with the upper surface thereof, as shown in FIG. 3. With the exemplary arrangement, the cam member 15 and the star wheel leg *34c* cooperate to impart rotational movement of 45° to the star wheels 32 and 34. Consequently, the star wheels are rotated until the leg *34c* is disposed at an angle of approximately 45° with the record, whereas the leg *32c* is disposed in substantially perpendicular relationship therewith. As previously mentioned, the cam member 15 tapers downwardly from the beginning to the end thereof. Accordingly, as further clockwise rotational movement is imparted to the record 10 the star wheel leg *34c* rides down the cam member 15 causing the phonograph arm 21 to be lowered to move the stylus 22 into the recorded groove 11, at substantially the beginning thereof, when the leg *34c* reaches an intermediate position along the cam member. The star wheels 32 and 34 are designed so that, thereafter, the record 10 is engaged by the stylus 22 whereas the legs of the star wheels are maintained above and out of engagement with the record. During the time when the star wheel leg *34c* is in cooperative relationship with the cam member 15, the leg *34c* is also engaged by the eccentric cam member 16. As continual clockwise rotational movement is imparted to the record 10, the cam member 16 cams the leg *34c* radially inwardly so that the phonograph arm 21 and the stylus are driven radially inwardly. Consequently, during subsequent revolutions of the record 10, the legs of the star wheel 34 are not engaged by the cam member 15. Once the playback stylus 22 is moved into the recorded groove 11, the phonograph system functions in a conventional manner to reproduce the message recorded on the record 10, and the phonograph arm 21 is gradually driven radially inwardly as the stylus rides in the recorded groove.

Figure 4:
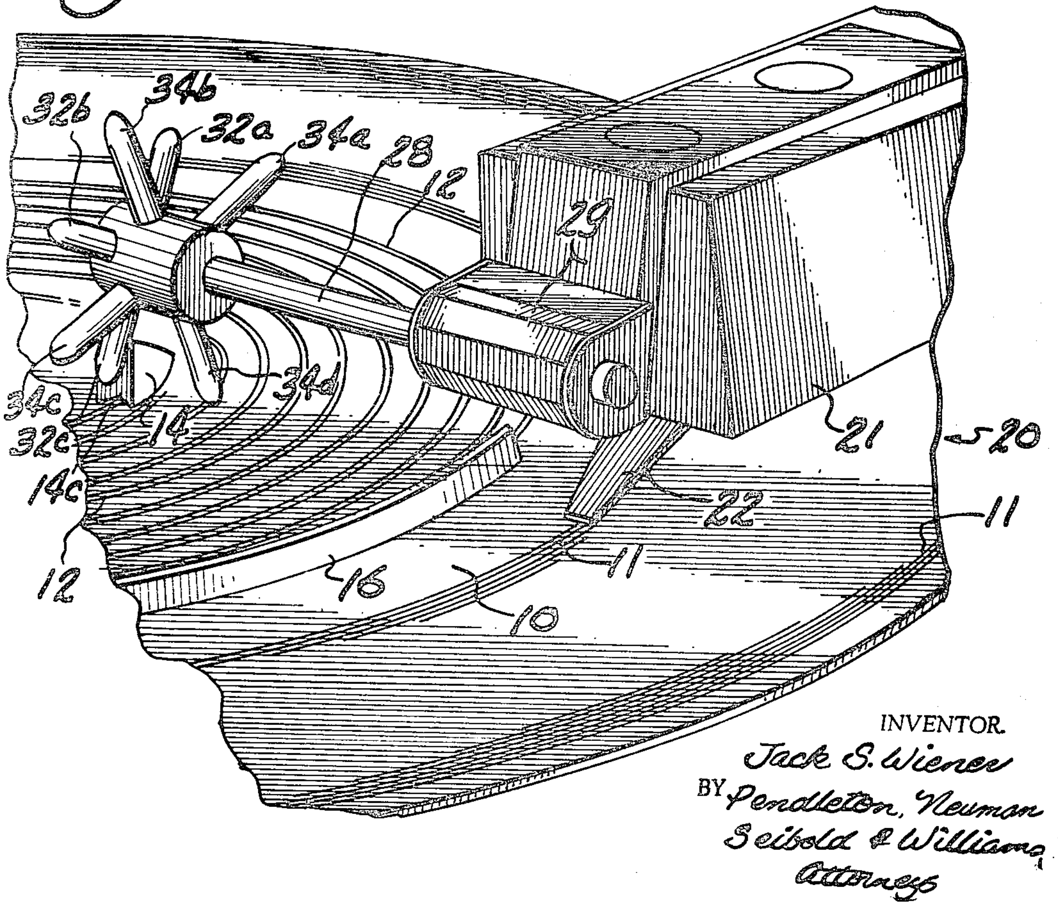
Figure 5:
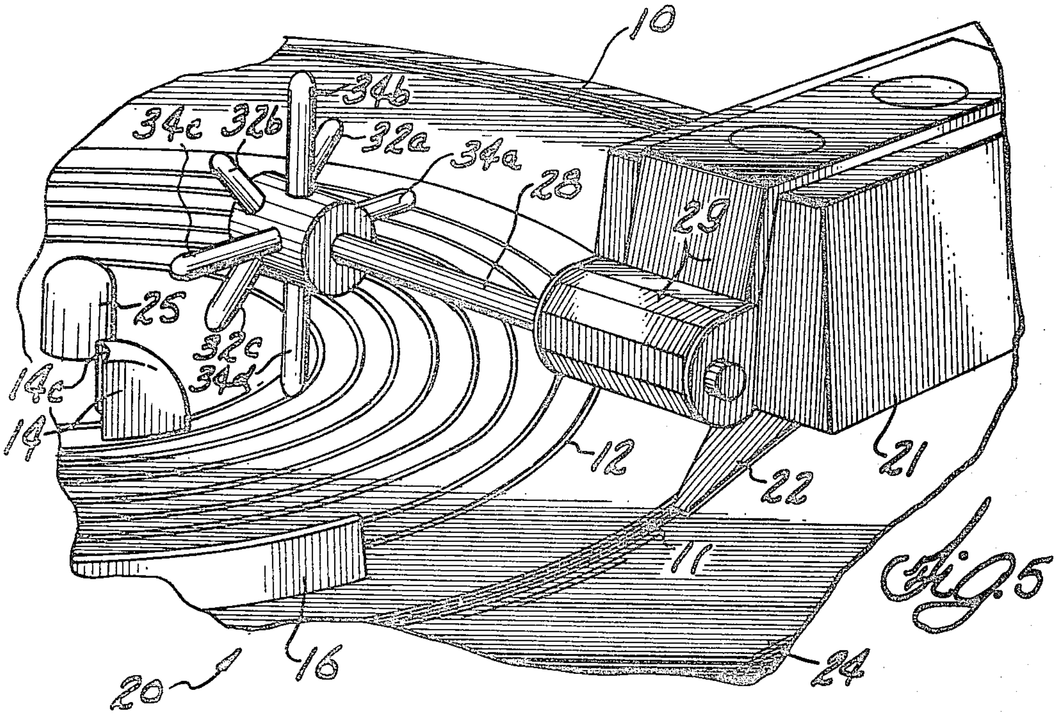

When the playback stylus 22 reaches substantially the end of the recorded groove 11, the then vertically downwardly disposed leg *32c* of the star wheel 32 is engaged by the leading surface of the cam member 14, which also has a circular indentation *14c* for catching the leg *32c* to insure engagement therebetween, as shown in FIG. 4. It follows then that as further clockwise rotational movement is imparted to the record 10, rotational movement is imparted to the star wheels 32 and 34 which causes the star wheel leg *34d* to be pivoted into the recycling groove 12, as shown in FIG. 5. With the exemplary arrangement, the cam member 14 and the star wheel leg *32c* cooperate to impart rotational movement of 45° to the star wheels 32 and 34 so that the leg *34d* is in substantially perpendicular relationship with the record. As the star wheel leg *34d* is pivoted into the recycling groove 12, the phonograph arm 21 is thereby driven upwardly away from the record 10 so that the playback stylus 22 is moved out of the recorded groove 11. Thereafter, as further clockwise rotational movement is imparted to the record 10, the star wheel leg *34d* rides in the recycling groove 12 so that the phonograph arm 21 is driven radially outwardly until the playback stylus 22 is positioned substantially adjacent the beginning of the recorded groove 11 and the star wheel leg *34d* is engaged by the leading edge of the cam member 15. The system then functions to again move the stylus into the recorded groove, as discussed above, and repeats the foregoing cycle.

In view of the foregoing, it will be seen that a continuously recycling phonograph system has been provided which automatically returns the playback stylus 22 to the beginning of the recorded groove 11 after the playback stylus has reached the end of the recorded groove. More specifically, it will be seen that such a system has been provided wherein means are provided for responding to the stylus reaching substantially the end of the recorded groove to impart movement to the arm to sequentially move the stylus (1) out of the recorded groove, (2) to a position adjacent the beginning of the recorded groove and (3) into the recorded groove at substantially the beginning thereof. Further, it will be seen that a new and improved phonograph record 10 has been provided for use in conjunction with such a system. Thus, a self-contained automatically recycling phonograph system has been provided which will repeat itself for an unlimited period of time. Moreover, it will be apparent that the working components of the exemplary system may be readily replaced. In this connection, it will be apparent that the phonograph record and the recycling stylus assembly may readily be replaced. Finally, it will be apparent that the exemplary system will always recenter itself in the event it begins in an intermediate position, so that the system will thereafter operate in a normal continuous fashion.

What is claimed is:

1. In a continuously recycling phonograph system, the combination which comprises a phonograph arm having a playback stylus, a phonograph record having a recorded groove formed therein adapted to be engaged by the stylus, a turntable for supporting the record for rotational movement, and means partially mounted on the phonograph arm and partially mounted on the record for imparting movement to the arm responsive to the stylus reaching substantially the end of the recorded groove to sequentially move the stylus (1) out of the recorded groove, (2) to a position adjacent the beginning of the recorded groove, and (3) into the recorded groove at substantially the beginning thereof.

2. In a continuously recycling phonograph system, the combination which comprises a phonograph arm having a playback stylus, a phonograph record having a recorded groove formed therein adapted to be engaged by the stylus, a turntable for supporting the record for rotational movement, means mounted on the phonograph arm and operable to move the arm so that the stylus is moved into and out of the recorded groove, and means forming a part of the record and operative to sequentially (1) render the phonograph arm means operative when the stylus reaches substantially the end of the recorded groove to move the arm so that the stylus is moved out of the recorded groove, (2) cooperate with the phonograph arm means to move the arm so that the stylus is moved to a position adjacent the beginning of the recorded groove, and (3) render the phonograph arm means operative to move the arm so that the stylus is moved into the recorded groove at substantially the beginning thereof.

3. In a continuously recycling phonograph system, the combination which comprises a phonograph arm having a playback stylus, a phonograph record having a recorded groove formed therein which is adapted to be engaged by the playback stylus, a turntable for supporting the record for rotational movement, a recycling groove formed in the record in a reverse direction to the recorded groove, means mounted on the phonograph arm operable to be moved into and out of the recycling groove to move the arm so that the stylus is respectively moved out of and into the recorded groove, the phonograph arm means being adapted to ride in the recycling groove, and means associated with the recycling groove and operative to sequentially (1) cause the phonograph arm means to move into the recycling groove when the stylus reaches substantially the end of the recorded groove so that the stylus is moved out of the recorded groove and so that the arm is moved as the phonograph arm means rides in the recycling groove to position the stylus adjacent the beginning of the recorded groove, and (2) cause the phonograph arm means to move out of the recycling groove when the phonograph arm means reaches substantially the end of the recycling groove so that the stylus is moved into the recorded groove at substantially the beginning thereof.

4. In a continuously recycling phonograph system, the combination which comprises a phonograph arm having a playback stylus, a phonograph record having a spiral recorded groove formed therein adapted to be engaged by the playback stylus, a turntable for supporting the record for rotational movement, a spiral recycling groove formed in the record in a reverse direction to the direction of the recorded groove, means mounted on the phonograph arm operable to be moved into and out of the recycling groove to move the arm so that the stylus is respectively moved out of and into the recorded groove, the phonograph arm means being adapted to ride in the recycling groove, means associated with the recycling groove for causing the phonograph arm means to move into the recycling groove when the stylus reaches substantially the end of the recorded groove so that the stylus is moved out of the recorded groove and so that the arm is moved as the phonograph arm means rides in the recycling groove to move the stylus to a position adjacent the beginning of the recorded groove, and means associated with the recycling groove for causing the phonograph arm means to move out of the recycling groove when the phonograph arm means reaches substantially the end of the recycling groove so that the stylus is moved into the recorded groove at substantially the beginning thereof.

5. In a continuously recycling phonograph system, the combination which comprises a phonograph arm having a playback stylus, a phonograph record having a spiral recorded groove formed therein adapted to be engaged by the playback stylus, a turntable for supporting the record for rotational movement, a spiral recycling groove formed in the record in a direction reverse to the direction of the recorded groove, means mounted on the phonograph arm operable to be moved into and out of the recycling groove to move the arm so that the stylus is respectively moved out of and into the recorded groove and being adapted to ride in the recycling groove, first cam means associated with the record for causing the phonograph arm means to move into the recycling groove when the stylus reaches substantially the end of the recorded groove so that the stylus is moved out of the recorded groove and so that the arm is moved as the phonograph arm means rides in the recycling groove to move the stylus to a position adjacent the beginning of the recorded groove, second cam means associated with the recycling groove for causing the phonograph arm means to move out of the recycling groove when the phonograph arm means reaches substantially the end of the recycling groove so that the stylus is moved into the recorded groove at substantially the beginning thereof, and third cam means associated with the second cam means for rendering the second cam means inoperative after the phonograph arm means is moved out of the recycling groove.

6. The continuously recycling phonograph system as recited in claim 5 wherein the phonograph arm means is in the form of a recycling stylus assembly including a pair of spaced star wheels mounted for concurrent rotational movement, each star wheel having an equal plurality of outwardly extending legs which are angularly offset with respect to the legs of the other star wheel and the legs of one of the star wheels being longer than the legs of the other star wheel, the first cam means engaging one of the shorter legs when the playback stylus reaches substantially the end of the recorded groove to impart rotational movement to the star wheels so that one of the longer legs is rotated into the recycling groove and the playback stylus is moved out of engagement with the recorded groove, and the second cam means engaging one of the longer legs when the longer leg in the recycling groove reaches substantially the end thereof to impart rotational movement to the star wheels so that the longer leg is rotated out of the recycling groove and the playback stylus is moved into engagement with the recorded groove.

7. The continuously recycling phonograph system as recited in claim 6 wherein the star wheels are four-point cross members disposed in parallel relationship.

8. The continuously recycling phonograph system as recited in claim 7 wherein the legs of the cross members are offset 45°.

9. In a record for use in a continuously recycling phonograph system having a playback stylus and a recycling stylus assembly, the combination which comprises a spiral recorded groove adapted to receive the playback stylus, and a spiral recycling groove having a direction reverse to the direction of the recorded groove and adapted to receive a portion of the recycling stylus assembly.

10. In a record for use in a continuously recycling phonograph system having a playback stylus and a recycling stylus assembly, the combination which comprises a spiral recorded groove adapted to receive the playback stylus, a spiral recycling groove having a direction reverse to the direction of the recorded groove and adapted to receive a portion of the recycling stylus assembly, and means for cooperating with the recycling stylus assembly to move the portion thereof into and out of the recycling groove.

11. In a record for use in a continuously recycling phonograph system having a playback stylus and a recycling stylus assembly, the combination which comprises a spiral recorded groove adapted to receive the playback stylus, a spiral recycling groove having a direction reverse to the direction of the recorded groove and adapted to receive a portion of the recycling stylus assembly, and cam members disposed at opposite ends of the recycling groove for cooperating with the recycling stylus assembly to move the portion thereof into and out of the recycling groove.

12. In a record for use in a continuously recycling phonograph system having a playback stylus and a recycling stylus assembly, the combination which comprises a spiral recorded groove adapted to receive the playback stylus, a spiral recycling groove having a direction reverse to the direction of the recorded groove and adapted to receive a portion of the recycling stylus assembly, an upstanding cam member disposed at the beginning of the recycling groove for cooperating with the recycling stylus assembly to move the portion thereof into the recycling groove, and an upstanding cam member disposed at the end of the recycling groove which tapers downwardly from the beginning to the end thereof and which cooperates with the recycling stylus assembly to move the portion thereof out of the recycling groove.

13. In a record for use in a continuously recycling phonograph system having a playback stylus and a recycling stylus assembly, the combination which comprises a spiral recorded groove adapted to receive the playback stylus, a spiral recycling groove having a direction reverse to the direction of the recorded groove and adapted to receive a portion of the recycling stylus assembly, a first upstanding cam member disposed at the beginning of the recycling groove for cooperating with the recycling stylus assembly to move the portion thereof into the recycling groove, a second upstanding cam member disposed at the end of the recycling groove which tapers downwardly from the beginning to the end thereof and which cooperates with the recycling stylus assembly to move the portion thereof out of the recycling groove, and an eccentric cam member associated with the second upstanding cam member for engaging the portion of the recycling stylus assembly during the time of engagement by the second upstanding cam member to move the recycling stylus assembly out of camming relationship with the second upstanding cam member.

References Cited

UNITED STATES PATENTS 2,925,279 2/1960 Fontaine ------------- 274—1

LEONARD FORMAN, *Primary Examiner.*

F. J. D'AMBROSIO, *Assistant Examiner.*